UNITED STATES PATENT OFFICE.

HENRY W. JOHNS, OF NEW YORK, N. Y.

IMPROVEMENT IN COMMINUTED ASPHALT FOR ROOFING, &c.

Specification forming part of Letters Patent No. 205,750, dated July 9, 1878; application filed December 14, 1875.

*To all whom it may concern:*

Be it known that I, HENRY W. JOHNS, of the city, county, and State of New York, have invented a new and useful article of manufacture which I denominate "Comminuted Asphalt;" and that the following is a full, clear, and exact description of the same and of the mode of manufacturing and using it.

Previous to my invention asphalt has not been used to the extent its value warrants, because of the great inconvenience of its application, it having been necessary heretofore to subject it to heat or to reduce it to a liquid or semi-fluid state when to be applied to a surface or to fill a cavity; and, as in the case of Trinidad asphalt, it has been found necessary to melt it before shipping to precipitate the earthy matter contained in it and render it capable of being economically melted again when wanted for use.

I have by my invention placed it within the power of any one to utilize this very valuable material without melting or liquefying it, and without the aid of any special utensils; have avoided the risk by fire; the offensiveness of odor and smoke incident to its melting; have preserved all the lasting and valuable natural properties, many of which are destroyed by evaporation when the asphalt is reduced to a fluid or semi-fluid state by heat; and at the same time have produced a material which is far more economical in its application when used as, or as an ingredient of, a cement, mortar, paste, or coating, which saving is due to its granular character, thereby avoiding the difficulties above named, as well as the adhesion to the implement employed in its spreading as a cement, as heretofore used.

I prepare the asphalt by crushing, grinding, pulverizing, or otherwise reducing it by any of the well-known methods, after which the powder or fine particles may be bolted or sifted, leaving the granules of a practically uniform and convenient size.

When to be transported dry, to avoid the particles sticking together, it may be mixed with sand, clay, lime, soap-stone, talc, or asbestus, or either or all of them, as may be preferred, according to the use such cement may be intended for, so that the surfaces of the granules may be kept apart, leaving it only necessary to add the cementing matter or solvent to be ready for use, the object being to gain a rough or granular body or surface, which is due to the shape of the particles of asphalt; my intention being also to add said comminuted asphalt to cements, mortars, pastes, and coatings, in lieu of other ingredients that might be substituted for it, and to retain its granular properties as nearly as possible.

In order to cement the surfaces of the particles of asphalt together, it not being my desire or intention to liquefy them, I add coal-tar, oils, benzine, or other suitable solvents to render the granules adhesive, forming a mass which can be easily spread or applied, the granules of asphalt also forming a very lasting and desirable top-dressing for roofs, pavements, and similar purposes.

It is obvious that such cement or compound may be molded or pressed into any desired shape.

Heretofore refined asphalt has been necessarily used on account of the earthy matter contained in the crude. By my invention asphalt in the latter condition may be very advantageously used for many purposes, the earthy matter being no objection, and all the natural and serviceable qualities of the asphalt are retained.

Having thus described my invention, what I claim, and desire to secure by Letters Patent, is—

1. Comminuted asphalt when mixed with a weak solvent, so as to unite the surfaces of the granules and not to reduce them to a dissolved condition.

2. Comminuted asphalt when mixed or treated, substantially as herein described, as a surface-dressing, and to be used for roofs, pavements, and other similar purposes.

HENRY W. JOHNS.

Witnesess:
 T. W. BAXTER,
 C. H. PATRICK.